Jan. 9, 1923.
J. S. WITTER.
TRACTOR PLOW.
FILED JULY 25, 1921.
1,441,773.
2 SHEETS—SHEET 1.
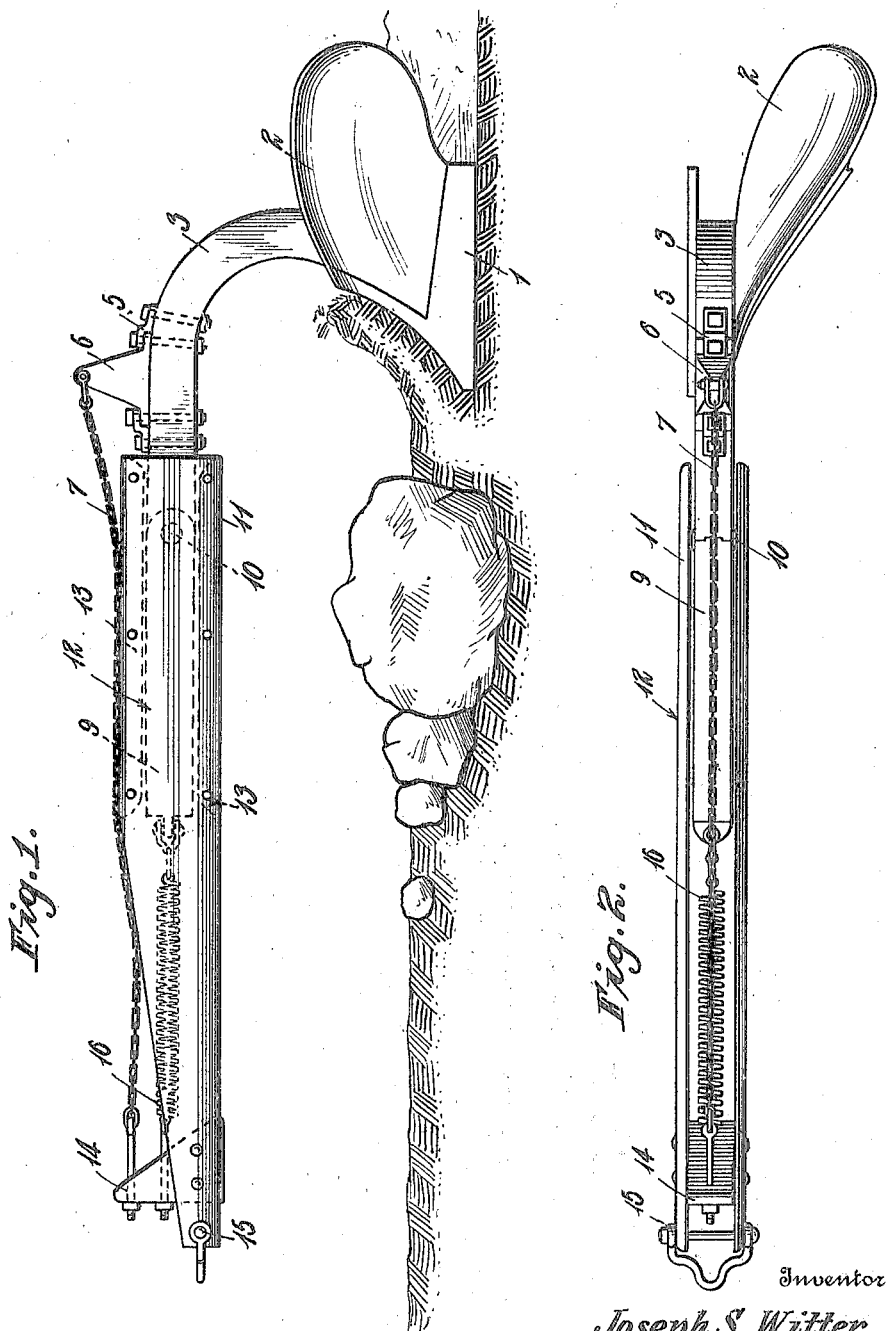
Inventor
Joseph S. Witter
By Cutterley & Kessmich
Attorney

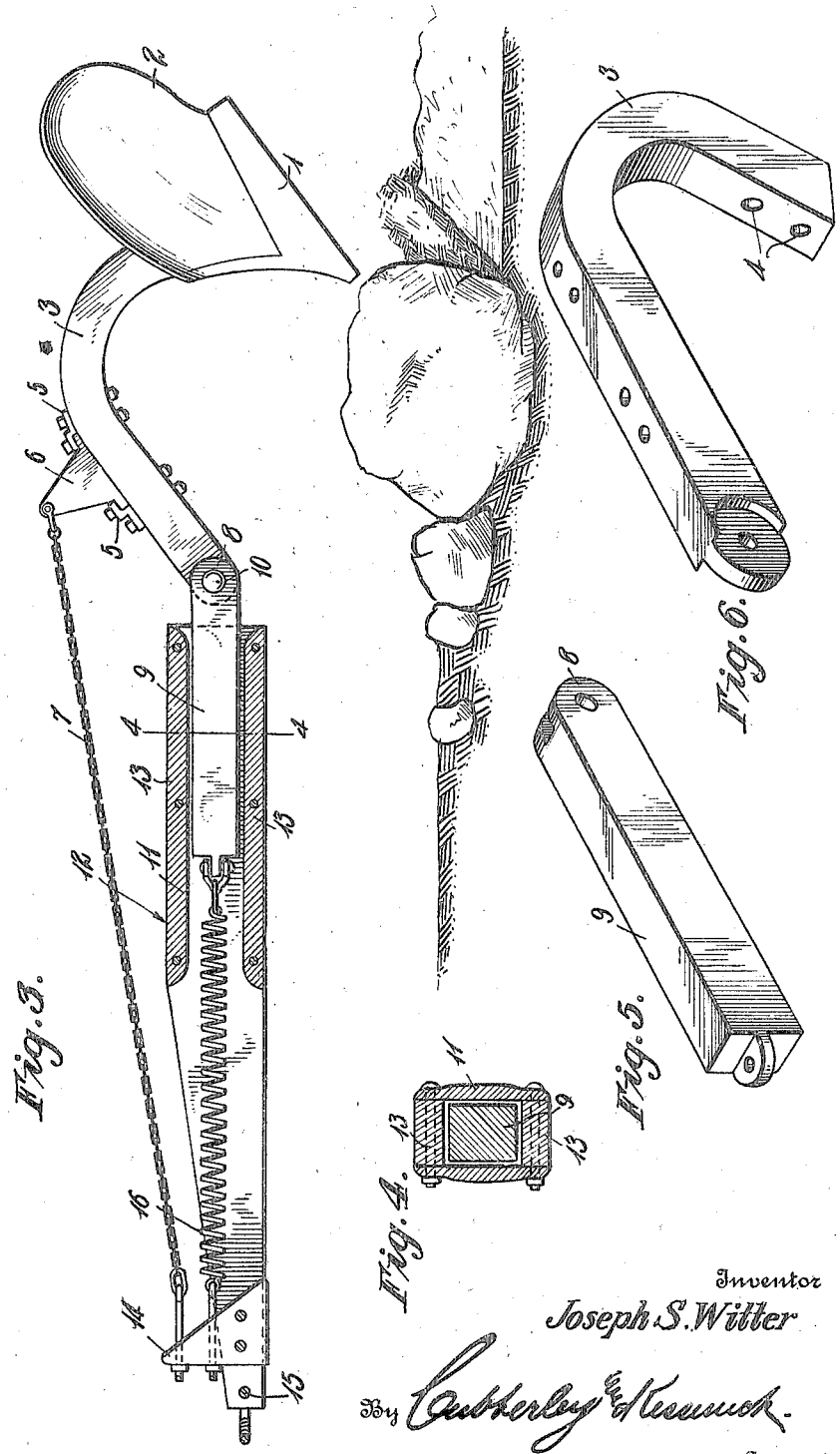

Patented Jan. 9, 1923.

1,441,773

UNITED STATES PATENT OFFICE.

JOSEPH S. WITTER, OF WELLSVILLE, NEW YORK.

TRACTOR PLOW.

Application filed July 25, 1921. Serial No. 487,246.

*To all whom it may concern:*

Be it known that I, JOSEPH S. WITTER, a citizen of the United States, residing at Wellsville, in the county of Allegany and State of New York, have invented certain new and useful Improvements in Tractor Plows, of which the following is a specification.

My invention relates, in general terms, to improvements in plows, and other similar ground-working implements, which are provided with means to effect automatic adjustment of the implement to overcome immovable obstacles such as large stones and the like encountered in the path or furrow. More particularly my invention is an improvement upon those plows which are drawn across a field by motive power, and which cannot be followed and manually guided as are horse driven plows.

In manipulating the so-called "tractor plow" the operator is seated upon the tractor in front of the plow, and as a consequence when an obstacle is encountered he must either stop the tractor or assume the risk of injuring the plow. My invention, in order to avoid this undesirable situation, contemplates the provision of a longitudinally movable, supplementary plow beam, to which the plow standard is pivotally connected for vertical movement only. Connected with the standard and with the primary plow beam are means actuated by the forward movement of the tractor for automatically exerting an upward pull upon the plow standard when an obstacle is encountered so that the plow share is caused to ride up and over the obstacle, and then return to its normal position without stopping the tractor or otherwise engaging the attention of the operator.

In addition to the foregoing desirable features and objects my invention includes means, in connection with the supplementary plow beam, for compensating and absorbing the shock caused by contact of the plow share with an obstacle; and also means for normally holding the plow share rigidly to its furrow. Furthermore, my invention is exceedingly simple and durable in construction, and includes no intricate or fragile parts which are liable to become broken or otherwise inapt for use.

To these and other ends, my invention consists in the construction, arrangement and combination of parts described hereinafter and pointed out in the claims forming a part of this specification.

The principal embodiment of my invention is shown by way of example in the accompanying drawings, wherein:—

Figure 1 is a side view of my plow in its normal operative position.

Figure 2, is a top plan view.

Figure 3, is a side view of my plow after it has engaged an obstacle, and the primary plow beam is in section to show the elevating and compensating mechanism used in conjunction with the standard and supplementary plow beam.

Figure 4, is a section taken on the line 4—4 of Figure 3.

Figure 5, is a perspective view of my supplemental plow beam, and

Figure 6, is a perspective view of the plow standard.

Like characters of reference refer to like or similar parts throughout the several views of the drawings, in which:—

The numeral (1) designates a conventional plow share carrying the usual mold board (2), and these are bolted to the standard (3) through openings (4) provided therein.

The standard (3) has mounted in opposed brackets (5) arranged on its horizontal reach, a vertical post (6) to which is secured one terminal end of a chain (7). The terminal end of the horizontal reach of the standard (3) is reduced for insertion between the arms (8) of the bifurcated end of a supplemental plow beam (9), and a bolt (10) is passed therethrough to pivotally connect the standard with the supplemental plow beam for vertical movement only.

The supplemental plow beam (9) is movably arranged between the side plates (11) of a primary plow beam (12), and rides between the top and bottom plates (13) which hold the side plates (11) together and form the body of the primary plow beam. Mounted between the side plates (11) at the forward end of the primary plow beam is a triangular block (14) to which is engaged the other end of the chain (7), and an end cross bar (15) between the side plates carries the fitting for attaching the plow to a tractor (not shown). Secured to the block (14) at a point below the chain (7), and engaged with the remaining end of the supplemental plow beam (9) is a contractile coil spring (16) which normally holds the supplemental plow beam, and a portion of the horizontal reach of the standard within the primary plow beam (12) as shown by the dotted lines in Figure 1. When in this position the plow assembly is held rigid by the plates (13) to retain the plow share in its furrow, and the chain (7) is relaxed and rests upon the upper plate (13) as in Figure 1.

When the plow share engages an obstacle as shown in Figure 3, the primary plow beam is drawn forward against the tension of the coil spring (16) until the pivotal connection between the standard and the supplemental beam is without the primary plow beam, and the standard is consequently free to move vertically, as shown in Figure 3. When in this position the chain (7) being connected with the block (14) of the primary plow beam exerts sufficient force to elevate the standard and cause the plow share to ride up and over the obstacle as illustrated. As soon as the obstacle has been passed the double effect of the force of gravity and the tension of the coil spring (16) causes the supplemental plow beam and standard to resume their normal operative position. It will be seen that the effect of the coil spring (16) is also to compensate for the shock due to contact of the plow share with stones and the like, and as the slow forward movement of the tractor (not shown) is continuous the action of the parts above specified is smooth and extremely effective.

While in the foregoing, there has been illustrated in the drawings and described in the specification such combination and arrangement of elements as constitute the preferred embodiment of my invention, it is nevertheless desired to emphasize the fact that interpretation of the invention should only be conclusive when made in the light of the subjoined claims.

Having described the invention and its objects with such attention to detail as will thoroughly acquaint one skilled in the art with its construction and advantages, I claim.

1. A plow comprising a hollow plow beam, a pivotally mounted, longitudinally movable standard normally locked within the hollow plow beam against vertical movement, means carried within the hollow plow beam for automatically releasing the standard, and means connecting the standard with the hollow plow beam for automatically elevating the standard when it is released.

2. A plow comprising a hollow primary plow beam, a pivoted standard normally locked within the primary plow beam against vertical movement, and a supplementary plow beam movably arranged within the primary plow beam for releasing the standard for vertical movement.

3. A plow comprising a hollow primary plow beam, a pivoted standard normally locked within the primary plow beam against vertical movement, a supplementary plow beam movably arranged within the primary plow beam and connected with the standard for automatically releasing the standard for vertical movement, and means for automatically elevating the standard when it is released.

4. A plow comprising a primary plow beam, a supplementary plow beam, movably arranged in the primary plow beam, a coil spring connecting the supplementary plow beam with the primary plow beam, a standard pivotally connected with the supplementary plow beam for vertical movement only, and means connecting the standard with the primary plow beam for elevating the standard upon independent movement of the primary plow beam with respect to the supplementary plow beam.

5. A plow comprising a hollow primary plow beam, a supplementary plow beam movably arranged within the primary plow beam, a standard having its horizontal reach pivotally connected with the supplementary plow beam, and resilient means connecting the supplementary plow beam with the primary plow beam to normally hold the same together with a portion of the horizontal reach of the standard within the primary plow beam for the purpose set forth.

In testimony whereof, I affix my signature hereto.

JOSEPH S. WITTER.